US010498894B1

United States Patent
Mongrain

(10) Patent No.: US 10,498,894 B1
(45) Date of Patent: Dec. 3, 2019

(54) SYSTEM, DEVICE, AND METHOD FOR ROUTING COMMUNICATIONS IN AN EMERGENCY SERVICE NETWORK

(71) Applicant: VESTA SOLUTIONS, INC., Temecula, CA (US)

(72) Inventor: Daniel Mongrain, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/175,908

(22) Filed: Oct. 31, 2018

(51) Int. Cl.
*H04M 3/51* (2006.01)
*H04M 3/523* (2006.01)

(52) U.S. Cl.
CPC ....... *H04M 3/5116* (2013.01); *H04M 3/5232* (2013.01); *H04M 2203/15* (2013.01)

(58) Field of Classification Search
USPC .......................................................... 379/52
See application file for complete search history.

(56) References Cited

U.S. PATENT DOCUMENTS

| 5,991,391 | A | 11/1999 | Miloslavsky | |
|---|---|---|---|---|
| 6,393,018 | B2 | 5/2002 | Miloslavsky | |
| 8,526,576 | B1 * | 9/2013 | Deich | H04M 11/04 370/352 |
| 8,929,856 | B1 * | 1/2015 | Kamboh | H04L 61/1511 455/404.2 |
| 2012/0320912 | A1 * | 12/2012 | Estrada | H04W 4/90 370/389 |
| 2013/0051213 | A1 * | 2/2013 | Kaushal | H04L 65/1066 370/216 |
| 2014/0207876 | A1 * | 7/2014 | Herron, Jr. | H04L 51/20 709/206 |
| 2015/0085858 | A1 * | 3/2015 | Kamboh | H04L 45/3065 370/353 |
| 2015/0085997 | A1 * | 3/2015 | Biage | H04M 3/5116 379/45 |
| 2015/0229766 | A1 | 8/2015 | Herron et al. | |
| 2016/0100056 | A1 | 4/2016 | Kamboh et al. | |
| 2018/0352094 | A1 * | 12/2018 | Ginter | H04M 7/0087 |

OTHER PUBLICATIONS

NENA Overview of Policy Rules for Call Routing and Handling in NG9-1-1 NENA 71-502, Version 1, Aug. 24, 2010 https://www.nena.org/resource/resmgr/Standards/NENA_71-502_Policy_Rules_08-.pdf.

* cited by examiner

*Primary Examiner* — Maria El-Zoobi
(74) *Attorney, Agent, or Firm* — Raguraman Kumaresan

(57) ABSTRACT

A system and method for routing communications in an emergency service network. In operation, an upstream functional element, for example, an emergency service routing proxy operating in the emergency service network, receives a call queue state notification from downstream functional elements, for example, public safety answering points. The call queue state notification indicates a state of a call queue respectively associated with the one or more of the public safety answering points and further includes routing control variables and a corresponding value selected by the downstream functional elements for each routing control variable. When the upstream functional elements receive an incoming emergency call from a call originating device, the upstream functional element selects a downstream functional element based at least in part on the routing control variables and the corresponding value, and further routes the incoming emergency call to the selected downstream functional element.

17 Claims, 6 Drawing Sheets

SYSTEM, DEVICE, AND METHOD FOR ROUTING COMMUNICATIONS IN AN EMERGENCY SERVICE NETWORK

BACKGROUND OF THE INVENTION

Conventional emergency response systems employ circuited switched network through which voice call is routed to an appropriate emergency call center that is geographically capable of initiating a response to the emergency. However, the circuit switched nature of the call limits the ability of the caller to share other forms of information such as text, images, video, and data to the emergency call center. To address this limitation, the National Emergency Number Association (NENA) identified the need for Next Generation 9-1-1 (NG9-11) in order to update emergency services infrastructure to include a packet switched network and to have the emergency call center accept emergency information including multimedia data from a caller. The NG9-11 system architecture is currently defined in a technical specification, commonly referred to as NENA "i3" standard.

NENA "i3" standard defines an Internet-Protocol (IP) based system. The IP based system includes different call routing entities that are responsible for routing an incoming emergency call to a downstream entity such as an emergency call center that can provide emergency assistance to the caller. The call routing entities receive information from upstream entities and invoke policy routing functions to perform the routing decision. However, current NENA "i3" standard limits the type of information that can be included in a standard event notification sent to call routing entities from downstream entities. This limitation may result in the degradation of emergency call service because the routing decisions are made based on very coarse data shared by the downstream entities.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
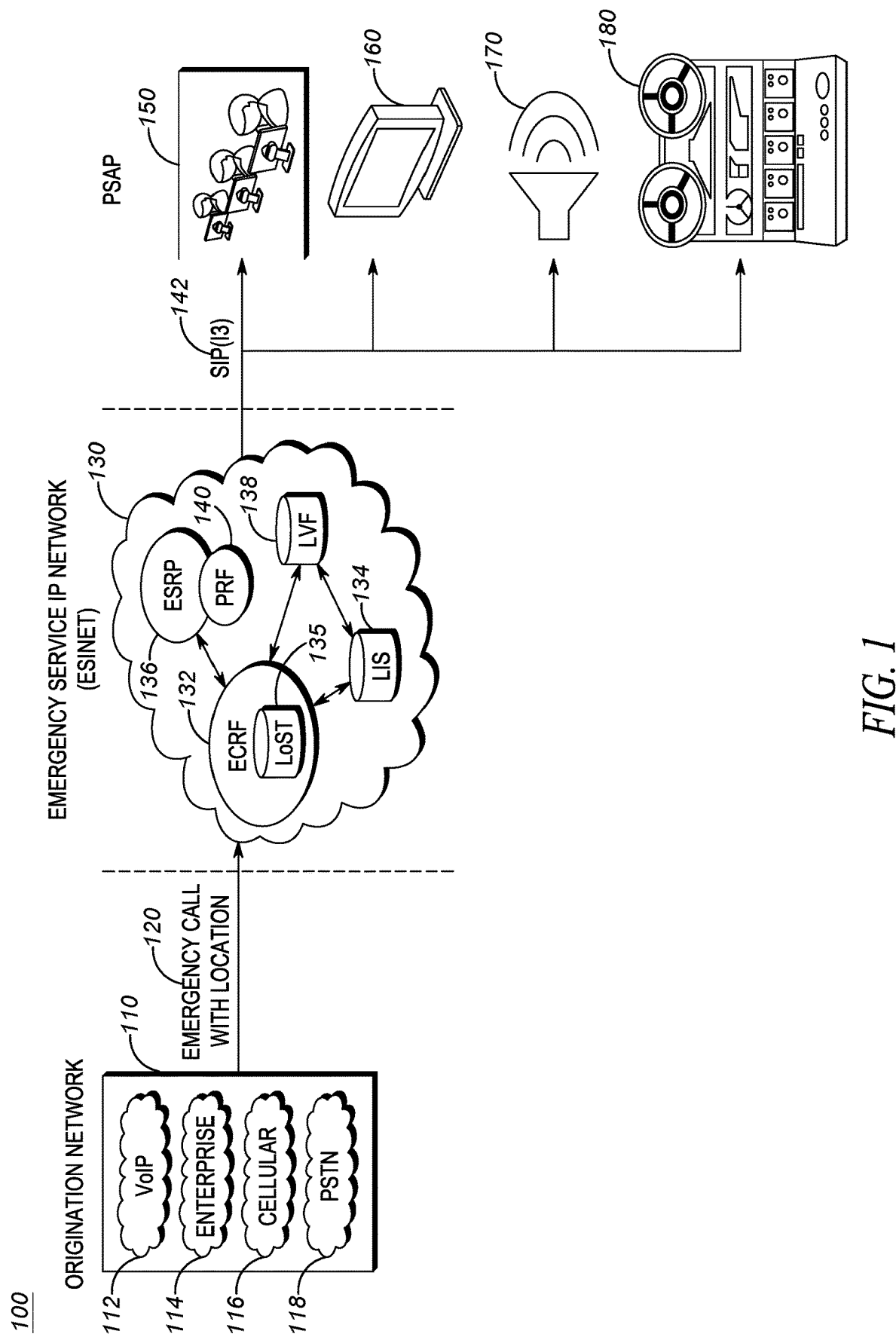
FIG. 1 shows a network diagram for an emergency response system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described above, conventional call routing entities perform routing decisions on very coarse data. As specified in the NENA "i3" standard, downstream functional elements, for example, public safety answering points, use information associated with call queue state to advertise their ability to handle "i3" emergency calls. Currently, the "i3" standard limits the information contained in the call queue state to include state enumeration, current queue length, and allowed maximum length. These fields can be used by the upstream functional elements, i.e., call routing entities to perform their routing decisions. However, the ability of downstream functional elements to handle "i3" emergency calls can be much more granular, for example, a particular downstream functional element may be able to take a total of ten (10) voice calls, but not thirty (30) text calls. Unless the upstream functional elements keep track of calls and knows the granular capacity of the downstream functional elements, the upstream functional elements may not be able to make a finer grained routing decision.

Disclosed is an improved process of routing communications in an emergency service network. The process enhances the upstream functional elements' ability to make a finer grained routing decision by enabling the downstream functional elements to modify its call queue state notification (e.g., "i3" call queue state event notification) to include arbitrary variables that further indicate capabilities of entities that are responsible for handling the emergency calls at a granular level. The upstream functional elements can use the values associated with these arbitrary variables to tailor the calls offered to the downstream functional elements.

One embodiment provides a method of routing communications in an emergency service network. The method includes: receiving, at an upstream functional element of the emergency service network, a call queue state notification from one or more downstream functional elements of the emergency service network, the call queue state notification indicating a state of a call queue respectively associated with the one or more downstream functional elements and further including one or more routing control variables and a corresponding value selected by the one or more downstream functional elements for each of the one or more routing control variables; receiving, at the upstream functional element, an incoming emergency call from at least one other upstream functional element of the emergency service network; selecting, at the upstream functional element, one of the one or more downstream functional elements based at least in part on the one or more routing control variables and the corresponding value selected by the one or more downstream functional elements; and routing, at the upstream functional element, the incoming emergency call to the selected one of the one or more downstream functional elements.

Another embodiment provides an upstream functional element operating in an emergency service network. The upstream functional element includes a network interface; and an electronic processor communicatively coupled to the network interface. The electronic processor configured to: receive, via the network interface, a call queue state notification from one or more downstream functional elements of the emergency service network, the call queue state notification indicating a state of a call queue respectively associated with the one or more downstream functional elements and further including one or more routing control variables and a corresponding value selected by the one or more downstream functional elements for each of the one or more routing control variables; receive, via the network interface, an incoming emergency call from at least one other upstream functional element of the emergency service network; select one of the one or more downstream functional elements based at least in part on the one or more routing control variables and the corresponding value selected by the one or more downstream functional elements; and route, via the network interface, the incoming emergency call to the selected one of the one or more downstream functional elements.

Yet another embodiment provides an emergency response system. The emergency response system includes a plurality of public safety answering points and an emergency service routing proxy configured to communicate with the public safety answering points via an emergency service internet protocol (IP) network. The emergency service routing proxy is configured to: receive a call queue state notification from one or more of the public safety answering points, the call queue state notification indicating a state of a call queue respectively associated with the one or more of the public safety answering points and further including one or more routing control variables and a corresponding value selected by the one or more of the public safety answering points for each of the one or more routing control variables; receive an incoming emergency call from a call originating device; select one of the one or more of the public safety answering points based at least in part on the one or more routing control variables and the corresponding value selected by the one or more of the public safety answering points; and route the incoming emergency call to the selected one of the one or more of the public safety answering points.

Referring now to the drawings, and in particular FIG. 1, a network diagram for an emergency response system 100 is shown. In accordance with some embodiments, the system 100 is a packet switched multimedia capable emergency response system. The system 100 includes an origination network 110 that corresponds to a location where the emergency call (e.g., NG9-11 call) 120 originates. The emergency calls 120 is a multimedia capable emergency call and may further originate from a human user of a call originating device (e.g., cell phone, landline telephone, smartphone, personal computer, tablet computer, email client, smart speaker/home assistant, and the like) that is capable of transmitting multimedia data or an automated system coupled with the origination network 110, for example, via electronic, fiber optic, wireless, or a combination of mediums thereof. The origination network 110, for example, includes a voice over IP (VoIP) network 112, an enterprise network 114, a cellular network 116, or a public switched telephone network (PSTN) 118. Other possibilities of types of origination network 110 exist as well.

In operation, an emergency call 120 is placed from the origination network to an emergency service IP network (ESINET) 130. In accordance with some embodiments, the emergency call 120 includes location data of the caller. The ESINET 130 can provide, among other functions, routing of the emergency call 120 to an appropriate public safety answering point (PSAP) 150. For example, one ESINET 130 may be connected to multiple PSAPs 150. The ESINET 130 includes a number of functional elements (FE), such as an emergency call routing function (ECRF) 132, location information store (LIS) 134, emergency service routing proxy (ESRP) 136, and location validation function 138 which collectively determine which PSAP 150 the incoming call should be routed to. The ECRF 132 includes a directory of available PSAPs 150. The ECRF 132 is configured to determine the appropriate PSAP for incoming communications, based, at least in part, on the location of the emergency call 120. The ECRF 132 further includes a location information store (LIS) 134 that provides appropriate location information associated with the emergency call 120. The ECRF 132 employs a location to service translation (LoST) protocol 135 that uses location of the emergency call 120 and a service uniform resource network (URN) to return a uniform resource identifier (URI) that is used to route the emergency call towards the appropriate PSAP for the caller's location.

The incoming emergency call is received by an emergency service routing proxy (ESRP) 136. The ESRP 136 is configured to query the LIS 134 for the appropriate location information associated with the emergency call 120. In some implementations, the ESRP 136 and LIS 134 are coupled with a location validation function (LVF) 138. The LVF 138 can be used to ensure the location of the emergency call is a valid location. Once the ESRP 136 has identified a valid location for the event, the ESRP 136 may be configured to query the ECRF 132 using at least the validated location to determine the appropriate PSAP 150. The ESRP 136 can then route the emergency call 120 to the selected PSAP 150.

In accordance with embodiments, when an incoming emergency call is received at the emergency service network, i.e., ESINET 130, an entity within the ESINET 130 performs a routing decision that leads to the emergency call being routed to another entity within the ESINET 130 or to an appropriate PSAP 150. The entity responsible for performing a routing decision is hereinafter referred to as an upstream functional element. As a result of the routing decision, an incoming emergency call that is maintained, for example, in a logical call queue at the upstream functional element, is routed from the upstream functional element to another entity that is herein referred to as a downstream functional element. In accordance with some embodiments, the ESRP 136 may serve as an upstream functional element when an incoming emergency call is received at the ESRP 136 from the origination network 110. In these embodiments, the PSAP 150 may serve as a downstream functional element when the ESRP 136 makes a routing decision to route the emergency call from the ESRP 136 to the PSAP 150.

In accordance with some embodiments, the emergency call 120 may be routed to one or more other functional elements (e.g., other ESRPs (not shown)) within the ESINET 130 before being routed to an appropriate PSAP 150. In these embodiments, the emergency call 120 may pass through multiple hops of functional elements (i.e., upstream/downstream functional elements) before reaching its final destination, for example, an appropriate PSAP 150. For example, when a call progresses through the ESINET 130, the ESRP 136 queries a policy-based routing function (PRF) 140 that resides in the ESRP 136 for routing determination. In response to this query, the PRF 140 extracts a rule set from the policy store "serving" the next hop and evaluates the applicable rules to determine the proper routing of the next hop that will receive the call. The ESRP 136 determines routing based initially on location and then on any applicable policy, to determine the next hop. The next hop is either another ESRP or a terminating ESRP (i.e., an ESRP 136 for the PSAP 150). The ESRP 136 then forwards the call to the next hop i.e., to a next downstream functional element.

In accordance with some embodiments, a queue of emergency calls that may be received at different destinations (whether operating as an intermediate hop (i.e., ESRP 136) or as a destination (i.e., PSAP 150)) is maintained within the system 100. In other words, the destination of every routing decision is conceptually a queue of calls. The queue can be large or small, it can have one or many sources (e.g., from origination network 110 or another ESRP) entering calls on a queue, it can have one or many sources taking calls off the queue (e.g., another ESRP or PSAP 150). In accordance with some embodiments, the entities configured to serve as downstream functional elements, for example, ESRPs 136 and PSAP 150, advertise the state of the call queue (also referred to as "call queue state") maintained at the respective functional elements to one or more upstream functional elements i.e. ESRPs 136 or a network node at the origination network 110. The call queue state is then used by the upstream functional elements to decide if a particular downstream functional element will be able to handle the incoming emergency call. For example, the call queue state notification received from a particular downstream functional element, such as PSAP 150, may indicate that the PSAP 150 is already handling a maximum number of allowed calls (as specified, for example, by queue size)), and therefore may be unable to accept any additional calls.

In accordance with embodiments, the downstream functional elements are configured to not only advertise the current call queue state information as specified in NENA "i3" standard, but also additional routing control variables and corresponding values that indicate the capabilities of downstream functional elements at a granular level. Current NENA "i3" standard specifies that the call queue state information includes information related to: state enumeration identifying a state of one or more entities that are responsible for handling the calls being enqueued in the call queue; current queue length identifying a current number of calls that are enqueued in the call queue; and allowed maximum length identifying a maximum number of the calls to be enqueued in the call queue. In addition, the downstream functional elements are configured to include arbitrary routing control variables that may be selected by the downstream functional elements to advertise their capabilities to the upstream functional elements. As used herein, the term "arbitrary" signifies that the variables may correspond to any parameter that can identify the call handling capabilities of the downstream functional element, and further may include a variable that was not previously configured (or requested) for routing decisions by the upstream functional element. In accordance with embodiments, when an incoming emergency service call is received from at least one other upstream functional element of the emergency service network (ESINET 130), an upstream functional element selects a downstream functional element based at least in part on the value associated with the routing control variable and further routes the incoming emergency service call to the selected downstream functional element.

In accordance with some embodiments, after the emergency call 120 is processed by different network entities (i.e. upstream and downstream functional elements) of the ESINET 130, the resulting session initiated protocol (SIP) message is transferred via a packet protocol (e.g., NENA i3 standard, transmission control protocol/internet protocol (TCP/IP)) to the packet capable PSAP 150. The SIP message or other packet multimedia emergency message (e.g., via simple mail transfer protocol (SMTP), hypertext transfer protocol (HTTP), hypertext transfer protocol secure (HTTPS)) is then used by the PSAP 150 to initiate an intake and response to the communication received from the origination network 110. Although, only one PSAP 150 is shown in FIG. 1, in other implementations, more than one PSAP 150 may be in communication with the ESINET 130. Each PSAP 150 may include one or more human or virtual agents capable of responding to the emergency event.

As shown in FIG. 1, the message 142 may be routed to other devices such as a monitor 160, a speaker, 170, or a recorder 180. The routing may be in the alternative or in parallel. In this way, the proper equipment may be selected for presentation of the multimedia data associated with a given emergency call. As shown in FIG. 1, the monitor 160, the speaker 170, and the recorder 180 are separate from but coupled with the PSAP 150. In some implementations, the monitor 160, the speaker, and the recorder 180 may be included within the PSAP 150 such as attached to an agent's workstation.

Figure 2:
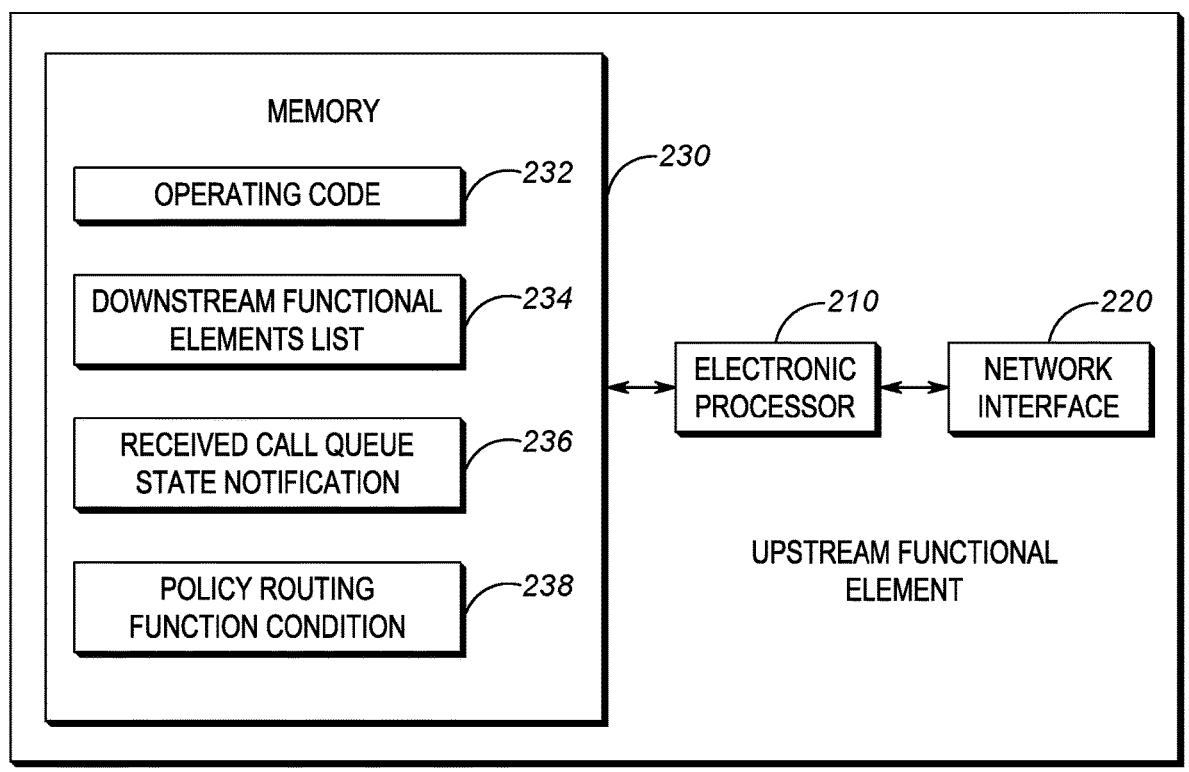
FIG. 2 shows a block diagram of an upstream functional element in accordance with some embodiments.

FIG. 2 is an example block diagram of an upstream functional element 200 operating within the emergency response system 100 in accordance with some embodiments. The upstream functional element 200 is implemented at one or more network devices or servers (e.g., ESRP 136) in the system 100, described above with respect to FIG. 1. In some embodiments, the functionality and components associated with the upstream functional element 200 are implemented in a distributed manner in different network devices or servers employed in the system 100.

As shown in FIG. 2, the upstream functional element 200 includes an electronic processor 210, for example, a microprocessor, a logic circuit, an application-specific integrated circuit (ASIC), a field-programmable gate array (FPGA), or another electronic device. The electronic processor 210 may include input and output interfaces (not shown) and be electrically connected to a network interface 220 and a memory 230. In some embodiments, the upstream functional element 200 may include fewer or additional components in configurations different from that illustrated in FIG. 2. For example, in some embodiments, the upstream functional element 200 may include a display, speaker, and microphone. In some embodiments, the upstream functional element 200 performs additional functionality than the functionality described below.

The network interface 220 sends and receives data to and from other functional elements and network entities in the system 100. The network interface 220 may include a transceiver for wirelessly communicating with other functional elements and network entities in the system 100. Alternatively, or in addition, the network interface 220 may include a connector or port for receiving a wired connection, such as an Ethernet cable. The electronic processor 210 may generate electrical signals and may communicate information relating to the electrical signals through the network interface 220, such as for receipt by other downstream functional elements (e.g., PSAPs 150) and other upstream functional elements (e.g., ESRPs 136). Similarly, the electronic processor 210 may output data received from other functional elements and network entities through the network interface 220, through a speaker or a display, or a combination thereof.

The memory 230 includes read-only memory (ROM), random-access memory (RAM), other non-transitory computer-readable media, or a combination thereof. For example, the memory 230 may comprise a hard disk drive (HDD), an optical disk drive (ODD) such as a compact disk (CD) drive or digital versatile disc (DVD) drive, a solid-state drive (SSD), a tape drive, a flash memory drive, or a tape drive, to name a few. The memory 230 may store operating code 232 that, when executed by the electronic processor 210, perform the methods described herein.

In accordance with embodiments, the memory 230 further includes a downstream functional elements list 234 that identifies downstream functional elements that can receive calls from queues. The list 234 may include a unique identifier (such as a network address including a uniform resource identifier or another identifier) for each of the downstream functional elements identified in the list. In accordance with some embodiments, the upstream functional element 200 may receive a request for registering the downstream functional element. The request may identify a network address (e.g., corresponding to a call queue) at which the downstream functional element is available to handle the routed emergency calls. In response to receiving the request, the electronic processor 210 of the upstream functional element 200 updates the list 234 to include the network address of the downstream functional element. In other embodiments, the downstream functional elements list 234 that identifies the downstream functional elements may be received from another network entity (e.g., a network entity responsible for registering the downstream functional elements on behalf of the upstream functional element 200) in the system.

In accordance with embodiments, the electronic processor 210 of the upstream functional element 200 is further configured to receive, via the network interface 220, a call queue state notification (e.g., "i3" 'QueueState' event notification) from one or more downstream functional elements. The received call queue state notification 236 may be stored at the memory 230. The call queue state notification 236 indicates a state of the call queue (i.e., inbound call queue) respectively maintained by the one or more downstream functional elements. As used herein, the term "inbound call queue" identifies a queue of emergency calls which are placed to be handled by a downstream functional element. In accordance with some embodiments, the call queue state notification received from the downstream functional elements further includes one or more routing control variables and a corresponding value selected by the one or more downstream network nodes for each of the one or more routing control variables. As used herein, the term "routing control variables" refers to variables and corresponding values that indicate additional information related to the capabilities associated with the downstream functional elements at a granular level. In accordance with some embodiments, the routing control variables are selected from the group consisting of: a number of calls of a given media type that are currently being handled by the downstream functional element; a maximum number of calls of a given media type to be handled by the downstream functional element; and a number of agents with a given skill, knowledge, or a spoken language associated with the downstream functional element. For example, the routing control variable may include one or more of: a first variable that identifies a number of voice calls currently being handled by the downstream functional element; a second variable identifying a maximum number of voice calls to be handled by the one or more downstream functional elements; a third variable that identifies a number of text calls currently being handled by the one or more downstream functional elements; a fourth variable that identifies a maximum number of text calls to be handled by the one or more downstream functional elements; a fifth variable identifying a number of video calls currently being handled by the one or more downstream functional elements; and a sixth variable identifying a maximum number of video calls to be handled by the one or more downstream functional elements. Other possible variables that may affect the handling of the emergency calls at the downstream functional elements may exist as well.

In accordance with some embodiments, the electronic processor 210 of the upstream functional element 200 generates and further stores a policy routing function condition 238 at the memory 230. The policy routing function condition 238 is generated using the one or more routing control variables included in the received call queue state notification 236. In accordance with some embodiments, the electronic processor 210 of the upstream functional element 200 generates (i.e., in response to receiving the routing control variables from the downstream functional element) a policy routing function condition 238 that defines a policy routing rule relative to each of the one or more routing control variables. In some embodiments, the policy routing rule is determined in response to the received call queue state notification based on user input or automatically determined based on machine learning algorithms, for example, based on historic routing decisions i.e., based on emergency calls that were handled in the past and further sharing similar characteristics (e.g., incident type, location, user phone number etc.,) as each other. In accordance with some embodiments, the policy routing function condition 238 may specify that a downstream functional element is to be considered for routing only when the value associated with the routing control variable received from a particular downstream functional element meets the policy routing rule that is defined relative to the routing control variable. In these embodiments, the policy routing rule may specify a threshold value or another variable for comparison against each routing control variable received from a downstream functional element, to determine whether the downstream functional element will be selected for routing the incoming emergency call. In some embodiments, the policy routing function condition 238 may include a particular rule (also referred to as policy routing rule) for selection of a downstream functional element for routing. For example, the rule may include one of: a) the value of the received routing variable should be smaller than a specified threshold value or another variable; b) the value of the received routing variable should be greater than a specified threshold value or another variable; c) the value of the received routing variable should be smaller than a specified threshold value or another variable; d) the value of the received routing variable should be greater than or equal to a specified threshold value or another variable; e) the value of the received routing variable should match a specified threshold value or another variable; f) the value of the received routing variable should include a fixed value or another variable; g) the value of the received routing variable should include a parameter "present" or its equivalent thereof and h) the value of the received routing variable should include a parameter "missing" or its equivalent thereof. Other variations of the above specified rules are possible as well.

In accordance with some embodiments, the electronic processor 210 of the upstream functional element 200 selects one of the downstream functional elements included in the list 234 based at least in part on the one or more routing control variables and the corresponding value included in the received call queue state notification 236, and further routes an emergency service call to the selected one of the downstream functional elements. In some embodiments, the electronic processor 210 of the upstream functional element 200 routes the emergency service call in accordance with the process defined in the session initiation protocol (SIP) standard (see FIG. 7).

Figure 3:
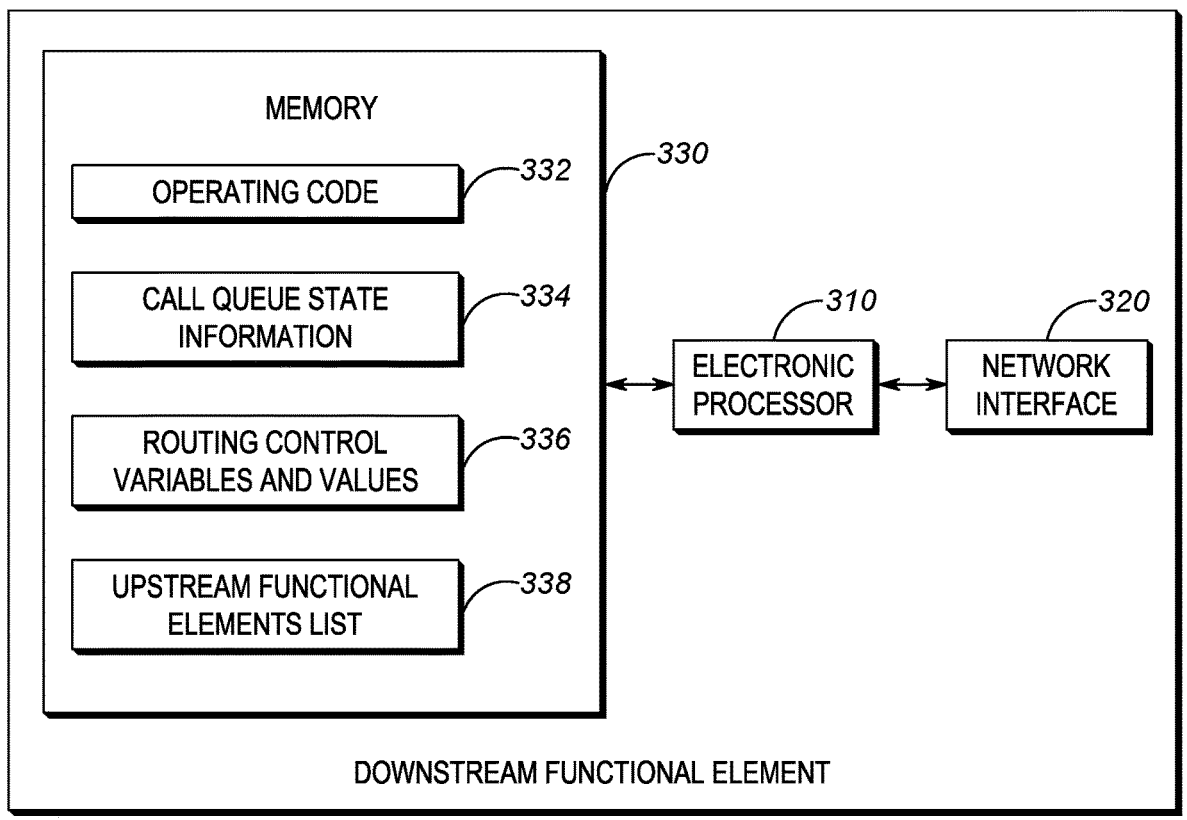
FIG. 3 shows a block diagram of a downstream functional element in accordance with some embodiments.

FIG. 3 is an example block diagram of a downstream functional element 300 operating within the emergency response system 100 in accordance with some embodiments. The downstream functional element 300 is implemented at one or more network devices or servers (e.g., ESRP 136 at the ESINET 130 or PSAP 150) in the system 100, described above with respect to FIG. 1. In some embodiments, the functionality and components associated with the downstream functional element 300 are implemented in a distributed manner in different network devices or servers employed in the system 100.

As shown in FIG. 3, the downstream functional element 300 includes an electronic processor 310, for example, a microprocessor, a logic circuit, an application-specific integrated circuit (ASIC), a field-programmable gate array (FPGA), or another electronic device. The electronic processor 310 may include input and output interfaces (not shown) and be electrically connected to a network interface 320 and a memory 330. In some embodiments, the downstream functional element 300 may include fewer or additional components in configurations different from that illustrated in FIG. 3. For example, in some embodiments, the downstream functional element 300 may include a display, speaker, and microphone. In some embodiments, the downstream functional element 300 performs additional functionality than the functionality described below.

The network interface 320 sends and receives data to and from other functional elements and network entities in the system 100. The network interface 320 may include a transceiver for wirelessly communicating with other functional elements and network entities in the system 100. Alternatively, or in addition, the network interface 320 may include a connector or port for receiving a wired connection, such as an Ethernet cable. The electronic processor 310 may generate electrical signals and may communicate information relating to the electrical signals through the network interface 320, such as for receipt by upstream functional elements (e.g., ESRPs 136) and other network devices associated with the downstream functional element 300. Similarly, the electronic processor 210 may output data received from other functional elements and network entities through the network interface 220, through a speaker or a display, or a combination thereof.

The memory 330 includes read-only memory (ROM), random-access memory (RAM), other non-transitory computer-readable media, or a combination thereof. For example, the memory 330 may comprise a hard disk drive (HDD), an optical disk drive (ODD) such as a compact disk (CD) drive or digital versatile disc (DVD) drive, a solid-state drive (SSD), a tape drive, a flash memory drive, or a tape drive, to name a few. The memory 330 may store operating code 332 that, when executed by the electronic processor 310, perform the methods described herein.

In accordance with embodiments, the electronic processor 310 of the downstream functional element 300 is configured to store, at the memory 330, call queue state information 334 that indicates a state of the call queue maintained by the downstream functional element 300. As used herein, the term "call queue" refers to a logical queue of calls that are enqueued for handling by the downstream functional element 300. The call queue state information 334, for example, as specified in NENA "i3" standard, includes: state enumeration identifying a state of one or more entities that are responsible for handling the calls being enqueued in the call queue; current queue length identifying a current number of calls that are enqueued in the call queue; and allowed maximum length identifying a maximum number of the calls to be enqueued in the call queue.

In accordance with embodiments, the memory 330 further stores one or more routing control variables and a corresponding value 336 for each of the routing control variables. The routing control variables and values 336 correspond to granular level call handling capabilities information associated with the downstream functional element 300. For example, the routing control variables are selected from the group consisting of: a number of calls of a given media type that are currently being handled by the downstream functional element 300; a maximum number of calls of a given media type to be handled by the downstream functional element 300; and a number of agents with a given skill, knowledge, or a spoken language associated with the downstream functional element 300. Other possible variables that may affect the quality of call handling at the downstream functional elements 300 may exist as well.

The downstream functional element 300 is configured to advertise the state of the call queue as specified in the call queue state information 334, to one or more upstream functional elements 200, via the network interface 320. For example, the downstream functional element 300 may extract information related to the upstream functional elements 200 from upstream functional elements list 338 stored at the memory 330 in order to advertise the state of the call queue to identified upstream functional elements 200. The list 338 may include a unique identifier (such as a network address including a uniform resource identifier or another identifier) for each of the upstream functional elements 200 identified in the list 338. The list 338 may be provisioned directly at the downstream functional element 300 or alternatively received from one or more other network entities (e.g., network entity that is responsible for registering the upstream functional elements 200) in the system 100.

The downstream functional element 300 transmits a call queue state notification to advertise the state of the call queue to identified upstream functional elements 200. In accordance with some embodiments, the electronic processor 310 of the downstream functional element 300 selects one or more routing control variables and corresponding values to be included in the call queue state notification. In some embodiments, the electronic processor 310 generates a call queue state notification, for example, in accordance with the SIP messaging standard, that includes: a) selected one or more routing controls and corresponding values and b) the state of the call queue identifying the information (i.e., state enumeration, current queue length, and allowed maximum length) to be included in accordance with "i3" standard. The electronic processor 310 of the downstream functional element 300 then transmits, via the network interface 320, the generated call queue state notification (i.e., a modified "i3" 'QueueState' event notification including routing control variables and values and state of the call queue) to the upstream functional element 200.

In some embodiments, the electronic processor 310 selects all the routing control variables and corresponding values 336 that are stored at the memory 330 to be included in the call queue state notification. In other embodiments, the electronic processor 310 may select only subset of the routing control variables and corresponding values 336 to be included in the call queue state notification. In these embodiments, the electronic processor 310 may use predefined variable selection criteria to select the routing control variables. For example, each routing control variable has a weight assigned to it, wherein the weight of each routing control variable is determined based on a scale of degradation of call service quality or call handling at the downstream functional element 300 if the call were to be routed to the downstream functional element 300 without consideration to the parameter identified by the routing control variable. For example, the weight may be directly proportional to the scale of degradation of call service. The predefined variable selection criteria may specify that only particular routing control variables having a minimum specified weight are to be selected. In other words, any routing control variable which may significantly (as defined by minimum specified weight) affect the call service quality or call handling may be selected to be included in the call queue state notification sent to the upstream functional elements 200. Other variations of the above specified criteria are possible as well.

Figure 4:
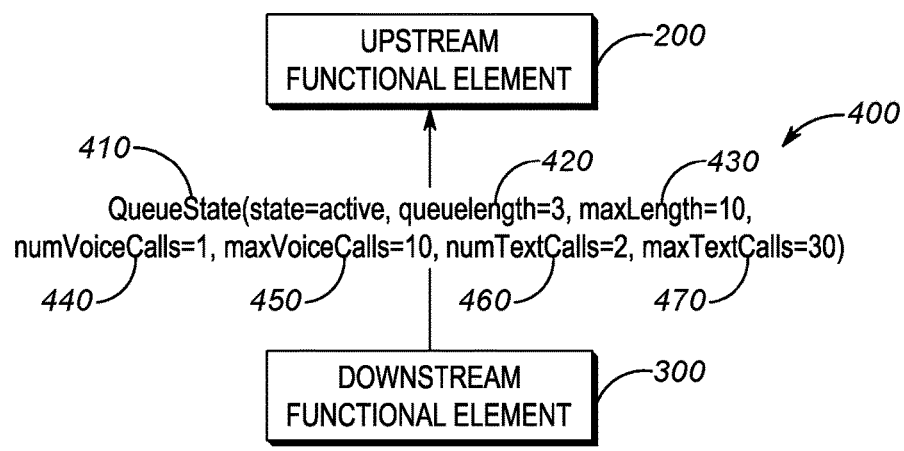
FIG. 4 shows an example of a modified "i3" call queue state notification being transmitted from a downstream functional element to an upstream functional element in accordance with some embodiments.

FIG. 4 shows an example of a modified "i3" call queue state notification 400 being transmitted from a downstream functional element 300 to an upstream functional element 200 in accordance with some embodiments. In accordance with embodiments, as shown in FIG. 4, the NENA "i3" call queue state notification 400, i.e., 'QueueState' event notification is modified to further include routing control variables and corresponding values selected by the downstream functional element 300. For example, the call queue state notification 400 shown in FIG. 4 includes, in addition to information related to the state of the call queue (i.e., state enumeration 410, queue length 420, and maximum length 430), routing control variables. In this example, the routing control variables included in the notification 400 include: a) 'numVoicecalls' 440 that identifies a number of voice calls currently being handled by the downstream functional element 300; b) 'maxVoiceCalls' 450 that identifies a maximum number of voice calls that can be handled by the downstream functional element 300; c) 'numTextCalls' 460 that identifies a number of text calls currently being handled by the downstream functional element 300; and d) 'maxTextCalls' 470 that identifies a maximum number of text calls that can be handled by the downstream functional element 300. In accordance with some embodiments, the upstream functional element 200 determines whether to select the downstream functional element 300 for routing a given incoming emergency call based at least in part on the routing control variables 440 through 470 that are included in the call queue state notification 400 received from the downstream functional element 300.

Figure 5:
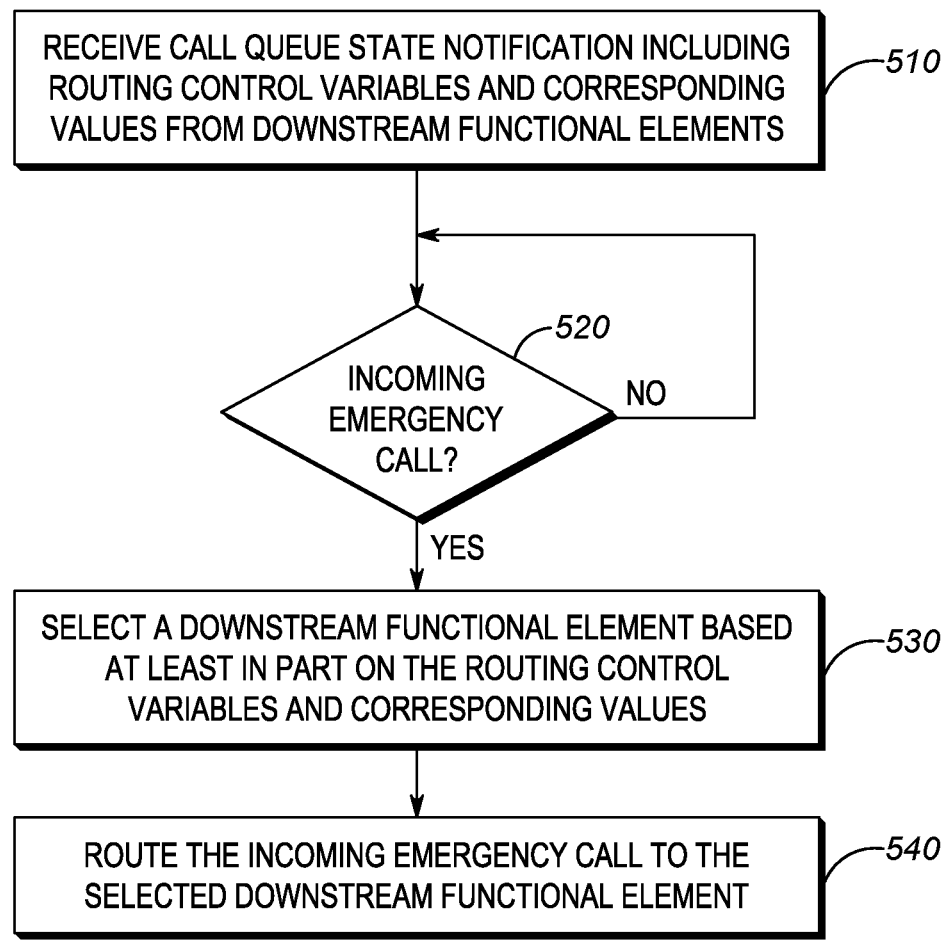
FIG. 5 illustrates a flowchart of a method of routing communications in an emergency service network shown in FIG. 1 in accordance with some embodiments.

FIG. 5 illustrates a flowchart of a method 500 of routing communications in an emergency service network, for example, ESINET 130 shown in FIG. 1 in accordance with some embodiments. While a particular order of processing steps, message receptions, and/or message transmissions are indicated in FIG. 5 as an example, timing and ordering of such steps, receptions, and transmissions may vary where appropriate without negating the purpose and advantages of the examples set forth in detail throughout the remainder of this disclosure. The method shown in FIG. 5 can be performed by one or more components, for example, electronic processor 210, network interface 220, and memory 230 of the upstream functional element 200, and will be described with reference to the functions and components of the system 100.

At block 510, the upstream functional element 200 (e.g., ESRP 136) receives a call queue state notification from one or more downstream functional elements 300 (e.g., another ESRP 136 or PSAP 150). In accordance with some embodiments, the received call queue state notification indicates a state of the call queue respectively associated with the one or more downstream functional elements 300, and further includes one or more routing control variables and a corresponding value selected by the one or more downstream functional elements 300 for each of the one or more routing control variables.

In one implementation, the call queue state notification received from the downstream functional element 300 corresponds to a NENA "i3" call queue state information ('QueueState' event) that is modified to include one or more routing control variables and corresponding values in addition to standard call queue information that includes state enumeration, current queue length, and allowed maximum length. As described previously, the one or more received routing control variables are selected from the group consisting of: a number of calls of a given media type (e.g., voice, data, video, audio, text, image, or application) that are currently being handled by the downstream functional element 300; a maximum number of calls of a given media type to be handled by the downstream functional element 300; and a number of agents with a given skill, knowledge, or a spoken language associated with the downstream functional element 300. For example, as shown in FIG. 4, the received call queue state notification 400 may specify that the downstream functional element 300 is currently handling one voice call and two text calls and that it will be able to handle a maximum of 10 voice calls and a maximum of 30 text calls. Similarly, the routing control variables may also specify a number of video calls currently being handled by the downstream functional element 300 and a maximum number of video calls that can be handled by the downstream functional element 300. As another example, the routing control variables may identify specific capabilities of call taking entities, for example, a number of call taking entities that are capable of speaking in a French language or a number of call taking entities that are trained to guide callers to perform a particular first-aid (e.g., cardiopulmonary resuscitation (CPR)) procedure. Other variables that identify granular level capabilities of entities associated with the downstream functional elements 300 are possible as well.

At block 520, the upstream functional element 200 determines if it has received an incoming emergency call from another upstream functional element (e.g., another ESRP 136). In accordance with some embodiments, the upstream functional element 200 performs this determination by checking if the inbound call queue associated with the upstream functional elements has one or more incoming emergency calls that are enqueued for routing to a downstream functional element 300. The inbound call queue may be identified by a uniform resource identifier and may either reside at the upstream functional element 200 or at one or more other network devices coupled to the upstream functional element 200. If the inbound call queue is empty or in other words if the inbound call queue does not have any emergency call enqueued for routing, then the upstream functional element continues to monitor the inbound call queue for incoming emergency calls. Otherwise, if there are one or more incoming emergency calls in the inbound call queue that are enqueued for routing, the method proceeds to block 530.

At block 530, the upstream functional element 200 selects a downstream functional element 300 based at least in part on the one or more routing control variables and the corresponding values selected by the one or more downstream functional elements 300. For example, the upstream functional element 200 may compare each routing control variable and corresponding value included in the call queue state notification 236 received from each downstream functional element 300 against a policy routing rule that is defined relative to each routing control variable in the policy routing function condition 238. For example, the policy routing function condition may specify that an incoming emergency call originating from a particular location or address is to be handled by a French speaking agent. In this case, the upstream functional element 200 determines if the call queue state notification 236 received from any of the downstream functional elements 300 includes one or more routing variables that indicate that a downstream functional element 300 is associated with human or virtual agents capable of speaking in French language. For example, a call queue state notification received from a particular downstream functional element 300 may include a first routing control variable 'numAvailableFrenchAgents' and corresponding value of two (2) to indicate that there are two agents available to handle calls in French language. In this example, the upstream functional element 200 may select the particular downstream functional element 300 since the routing control variable 'numAvailableFrenchAgents' and corresponding value of two (2) satisfy the policy routing rule defined, for example, in the policy routing function condition 238. In accordance with some embodiments, the policy routing function condition 238 may specify more than one policy routing rule (corresponding to the same or different routing control variables) that need to be satisfied for the selection of a particular downstream functional elements 300. As an example, the policy routing rule may specify that a downstream functional element 300 should be selected only when a call type associated with the emergency call is a voice call and further when the call queue state notification received from the downstream functional element 300 includes a value for a routing control variable identifying the number of voice calls, where the value should be further lower than a value for a routing control variable identifying the maximum number of voice calls. In another instance, the policy routing rule may specify that a downstream functional element should be selected only when a call type associated with the emergency call is a text call and further when the call queue state notification received from the downstream functional element 300 includes a value for a routing control variable identifying the number of text calls, where the value should be further lower than a value for a routing control variable identifying the maximum number of text calls. In yet another instance, the policy routing rule may specify that a downstream functional element should be selected only when a call type associated with the emergency call is a video call and further when the call queue state notification received from the downstream functional element 300 includes a value for a routing control variable identifying the number of video calls, where the value should be further lower than a value for a routing control variable identifying the maximum number of video calls.

Next, at block 540, the upstream functional element 200 routes the incoming emergency call to the selected downstream functional element 300. In accordance with some embodiments, the upstream functional element 200 performs the routing of the incoming emergency call in accordance with SIP messaging standard (see FIG. 7). In some embodiments, the upstream functional element 200 places the incoming emergency call for which routing decision is made at block 540, in an outbound queue. The downstream functional element 300 may receive an indication of routing a particular incoming emergency call. In one example, the downstream functional element 300 may receive an indication that the call is enqueued in the outbound queue for handling by the downstream functional element 300. In this example, the downstream functional element 300 may receive the uniform resource identifier associated with the outbound queue.

Figure 6:
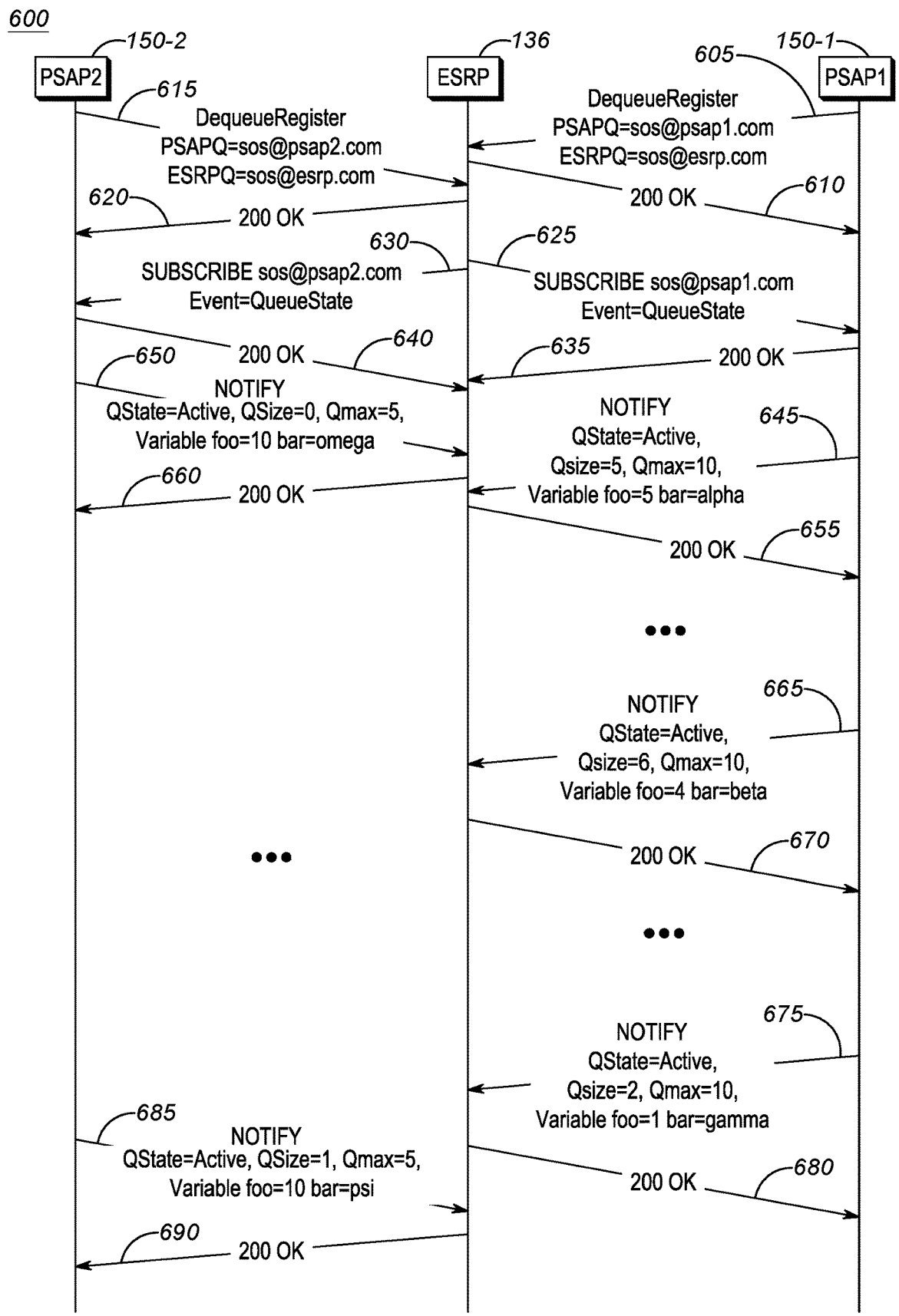
FIG. 6 shows an example call flow diagram illustrating call queue state notifications being transmitted from different downstream functional elements to an upstream functional element in accordance with some embodiments.

FIG. 6 shows an example call flow diagram 600 illustrating call queue state notifications being transmitted from different downstream functional elements 300 to an upstream functional element 200 in accordance with some embodiments. The call flow diagram 600 shows two downstream functional elements 300, i.e., a first PSAP (PSAP1) 150-1 and a second PSAP (PSAP2) 150-2, advertising their capabilities to an upstream functional element 200, i.e. ESRP 136, via call queue state notifications. The call flow diagram 600 shows messages that are generated and exchanged between the functional elements in accordance with SIP standards.

In accordance with some embodiments, the downstream functional element 300 registers to receive emergency calls from the upstream functional elements 200. As shown in FIG. 6, the first PSAP (i.e., PSAP1) 150-1 sends a dequeue registration message ('DequeueRegister') 605 to register with the ESRP 136. The message 605 may include an identifier or address, i.e., (e.g., sos@psap1.com) of the queue (i.e., 'PSAPQ') on which the PSAP 150-1 expects to receive calls. This 'PSAPQ' queue may reside at one or more network devices associated with the first PSAP 150-1. The message 605 may further include an identifier or address (e.g., sos@esrp.com) of the inbound queue or dequeue (i.e., ESRPQ) from which the first PSAP 150-1 expects to receive the call. In response to receiving the dequeue registration message 605, the ESRP 136 registers the first PSAP 150-1 and further sends a '200 OK' response 610 to the first PSAP 150-1 to indicate that the registration of the first PSAP 150-1 to receive incoming emergency calls was successful. Similarly, the second PSAP (i.e., PSAP2) 150-2 sends a dequeue registration message 615 to register with the ESRP 136. The message 615 may include an identifier or address (e.g., sos@psap2.com) of the queue (i.e., PSAPQ) on which the PSAP 150-2 expects to receive calls. This 'PSAP' queue may reside at one or more network devices associated with the second PSAP 150-2. The message 615 may further include an identifier or address (e.g., sos@esrp.com) of the inbound queue or dequeue (i.e., ESRPQ) from which the second PSAP 150-2 expects to receive the call. Responsive to receiving the dequeue registration message 615, the ESRP 136 registers the second PSAP 150-2 and further sends a '200 OK' response 620 to indicate that the registration of the second PSAP 150-1 to receive incoming emergency calls was successful.

In accordance with some embodiments, the upstream functional element 200, i.e., ESRP 136 requires further information about the state of the respective queues i.e., 'PSAPQs' on which the first PSAP 150-1 and second PSAP 150-2 respectively receive the call. As shown in FIG. 6, the ESRP 136 sends subscription messages 625, 630 ('SUBSCRIBE') to the first PSAP 150-1 and second PSAP 150-2, respectively. The subscription messages 625, 630 identify an event for which the ESRP requests to subscribe to receive notifications. In the example shown in FIG. 6, the event is identified as call queue state (i.e., 'QueueState'). In response to receiving the respective subscription messages 625, 630, the PSAPs 150-1 and 150-2 send '200 OK' responses 635, 640 to the PSAPs 150-1 and 150-2, respectively, to indicate that the subscription to receive call queue state notification was successful.

In response to receiving the subscription message 625, the first PSAP 150-1 sends a call queue state notification ('NOTIFY') 645 that includes the "i3" standard call queue state information i.e., state enumeration (i.e., Qstate=Active), queue size (i.e., Qsize=5), and maximum queue length (i.e., Qmax=10). In the example shown in FIG. 6, the notification 645 further includes routing control variables (i.e., Variable foo=5 and Variable bar=alpha). The variables 'foo' and 'bar' are provided herein as an example and may correspond to any arbitrary variable that represents the call handling capabilities of the first PSAP 150-1. Similarly, in response to the subscription message 630, the second PSAP 150-2 sends a call queue state notification ('NOTIFY') 650 that includes the "i3" standard call queue state information i.e., enumerations state (i.e., Qstate=Active), queue size (i.e., Qsize=5), and maximum queue length (i.e., Qmax=10). In the example shown in FIG. 6, the notification 635 further includes routing control variables (i.e., Variable foo=10 and Variable bar=omega). The variables 'foo' and 'bar' are provided herein as an example and may correspond to any arbitrary variable that represents the call handling capabilities of the second PSAP 150-2. While the example shown in FIG. 6 uses same routing control variables 'foo' and 'bar' to be included in the notifications 645, 650 respectively sent by PSAPs 150-1 and 150-2, the routing control variables may be same or different depending on the type of call handling capabilities that are respectively associated with the first and second PSAPs 150-1 and 150-2. In response to receiving the call queue state notifications 645 and 650, the ESRP 136 sends '200 OK' responses 655, 660 to the first and second PSAPs 150-1, 150-2, respectively, to indicate that the call queue state notifications 645, 650 were successfully received.

In accordance with some embodiments, the downstream functional elements 300 may periodically, or in response to a change in state of the call queue or routing controls variables or corresponding values, send an updated call queue state notification to the upstream functional elements 200. For example, as shown in FIG. 6, the call queue state notifications 665, 675 are sent by the first PSAP 150-1 to the ESRP 136. The ESRP 136 sends '200 OK' responses 670, 680 responsive to notifications 665, 675, respectively. In both the call queue state notifications 665, 675 the values associated with variables 'foo' and 'bar' are updated. Similarly, the call queue state notification 685 sent by the second PSAP 150-2 to the ESRP 136 includes updated values for the routing control variables 'foo' and 'bar'. The ESRP 136 sends 'OK' response 690 responsive to notification 685 received from the second PSAP 150-2 In accordance with embodiments, the ESRP 136 updates its call queue state notification 236 that is stored at the memory 230 to reflect the updates received in the most recent call queue state notifications 675, 685 respectively received from the first and second PSAPs 150-1, 150-2. The ESRP 136 then uses the updated routing variables and corresponding values of a particular PSAP 150 to determine whether the first PSAP 150-1 or second PSAP 150-2 will be considered for routing an incoming emergency call.

Figure 7:
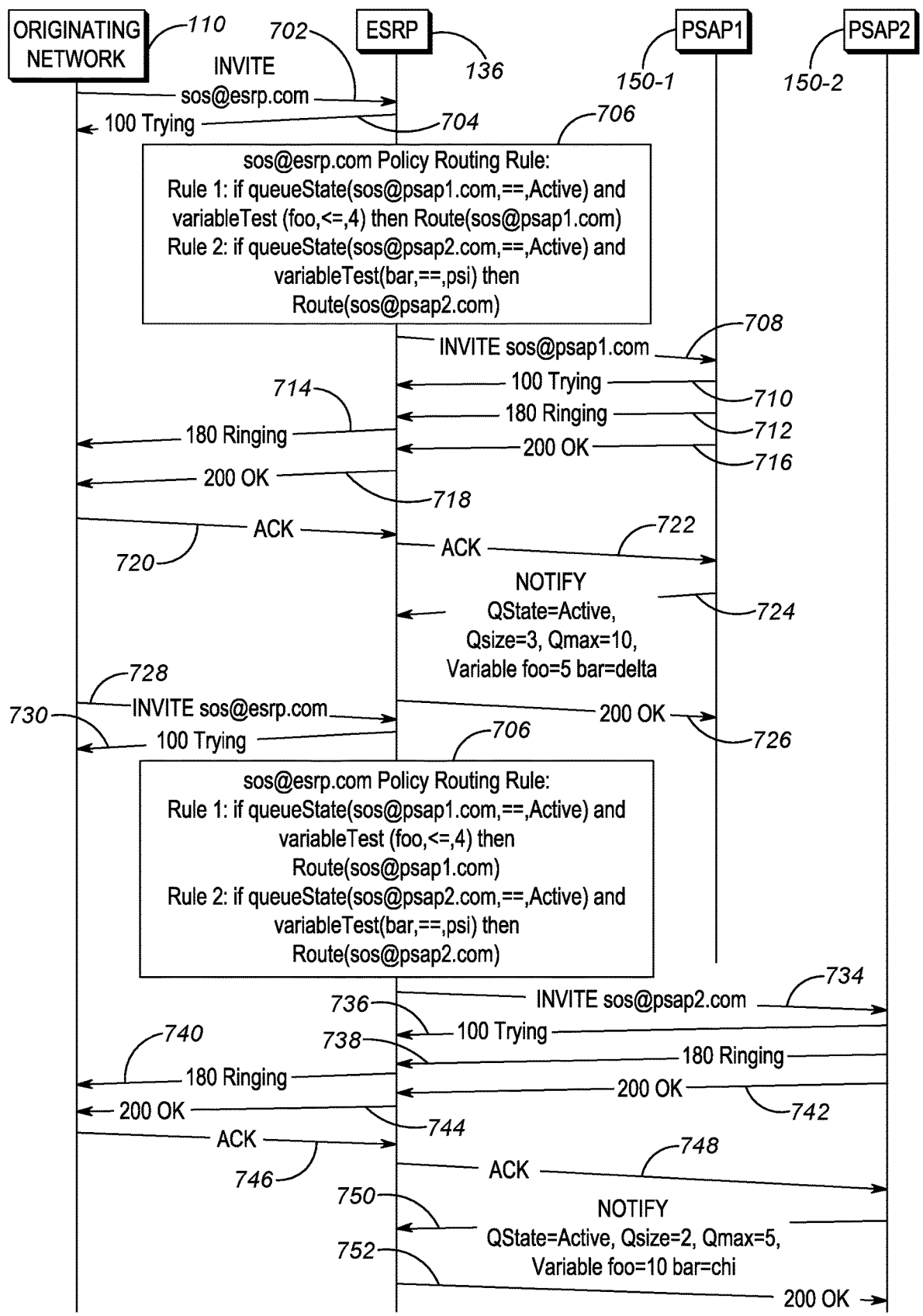
FIG. 7 shows an example call flow diagram illustrating a process of routing an incoming emergency call in accordance with some embodiments.

FIG. 7 shows an example call flow diagram 700 illustrating a process of routing an incoming emergency call in an emergency service network (e.g., ESINET 130) in accordance with some embodiments. The call flow diagram 700 shows messages that are generated and exchanged between the functional elements in accordance with SIP standards. While the call flow diagram 600 illustrates the call queue state notifications process and corresponding messages exchanged between ESRP 136 and PSAPs 150-1, 150-2, the call flow diagram 700 illustrates the process involved in routing incoming emergency calls received from the origination network 110 and corresponding messages exchanged between ESRP 136 and PSAPs 150-1, 150-2.

As shown in FIG. 7, an 'INVITE' message 702 is transmitted from the origination network 100 to the ESRP 136. For example, the invite message 702 may be transmitted from a user agent client (e.g., at a call originating device) operating within the origination network 110 to a user agent server operating at the ESRP 136 to initiate a SIP dialog with an intent to establish an emergency call. In response to the 'INVITE' message 702, the ESRP 136 transmits a '100 trying' message 704 to the origination network 110 to indicate that the user agent server at the ESRP 136 received the message 702 and is performing an extended search procedure in accordance with SIP. In accordance with embodiments, the ESRP 136 compares the routing variables and corresponding values included in the most recent call queue state notifications 675, 685, respectively received from PSAPs 150-1 and 150-2 (see FIG. 6) with a policy routing rule 706, that is selected, for example, from the policy routing function condition 238 stored at the memory 230. For example, as shown in FIG. 7, the policy routing rule 706 specifies that the value associated with the routing control variable 'foo' should be less than or equal to four (4) in order to consider the first PSAP 150-1 for routing the call. In this example, since the routing control variable 'foo' included in the call queue state notification 675 equals one (which is less than or equal to four as specified in the policy routing rule 706), the ESRP 136 decides to route the incoming emergency call to the first PSAP 150-1. Accordingly, the ESRP 136 sends an 'INVITE' message 708 to first PSAP 150-1 to initiate the call routing process. In response, the first PSAP 150-1, ESRP 136, and origination network 110 exchange standard SIP messages 710, 712, 714, 716, 718, 720, 722 to complete the call routing process and to establish a SIP connection between a caller device at the origination network and the first PSAP 150-1. In the example shown in FIG. 7, the first PSAP 150-1 further sends a call queue state notification 724 to the ESRP 136. The ESRP 136 sends '200 OK' response 726 to the first PSAP 150-1 responsive to the notification 724 received from the first PSAP 150-1. The call queue state notification 724 includes updated values corresponding to the routing variables 'foo' and 'bar'. In this case, the variable 'foo' is now updated to include a value of five, which is not less than or equal to four, as specified in the policy routing rule 706.

Next, the ESRP 136 receives an 'INVITE' message 728 from the origination network 110 and in response sends '100 trying' message 730 to the origination network 110. The ESRP 136, in response to receiving the 'INVITE' message 728, compares the policy routing rule 706 against the values included in the most recent call queue state notification 724 of first PSAP 150-1 and call queue state notification 685 of second PSAP 150-2 for the corresponding routing variables. In this example, since the routing variable 'foo' included in the most recent queue state notification 724 is not less than 4 as specified in Rule 1 of the policy routing rule 706 and further the routing variable 'bar' contains 'psi' as specified in Rule 2 of the policy routing rule 706, the ESRP 136 determines that the routing control variable included in the most recent call queue state notification 685 of second PSAP 150-2 meets the policy routing rule 706 and further selects the second PSAP 150-2 for routing the call corresponding to the 'INVITE' message 728. Accordingly, the ESRP 136 completes the routing and call establishment process by exchanging SIP messages 734, 736, 738, 740, 742, 744, 746, 748 between the second PSAP 150-2 and origination network 110 as shown in FIG. 7.

In the example shown in FIG. 7, the second PSAP 150-2 sends a subsequent call queue state notification 750. Responsive to the notification 750, the ESRP 136 sends a '200 OK' response 752 to the second PSAP 150-2. The routing variables 'foo' and 'bar' are updated in the notification 750. The values of the updated routing variables associated with second PSAP 150-2 may not satisfy the policy routing rule 706 when a subsequent incoming call is received at the ESRP 136 for routing. While the examples shown in FIGS. 6 and 7 illustrate that the updated call queue state notifications include values that are updated relative to the previously reported values associated with the same routing variables, in some implementations, the updated call queue state notifications may also add new variables and/or remove previously reported variables. In these implementations, the ESRP 136 may update the policy routing function condition 238 in order to add new policy routing rules or update existing policy routing rules to accommodate the newly reported routing control variables.

In accordance with embodiments, system and methods described herein can be advantageously implemented to improve the routing decisions of the call routing entities. In particular, the systems and methods described herein enable the downstream functional elements to advertise arbitrary variables that reflect their call handling capabilities at a granular level within a standard "i3" call queue state notification. This advertisement allows the upstream functional elements to generate new policy routing rules that provide for improved call routing decisions at the upstream functional elements.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a compact disc read-only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of routing communications in an emergency service network, the method comprising:
   receiving, at an upstream functional element of the emergency service network, a call queue state notification from one or more downstream functional elements of the emergency service network, the call queue state notification indicating a state of a call queue respectively associated with the one or more downstream functional elements and further including one or more routing control variables and a corresponding value selected by the one or more downstream functional elements for each of the one or more routing control variables;
   generating, in response to receiving the call queue state notification, a new policy routing function condition using the one or more routing control variables, wherein the new policy routing function condition defines a policy routing rule relative to the one or more routing control variables;
   receiving, at the upstream functional element, an incoming emergency call from at least one other upstream functional element of the emergency service network;
   selecting, at the upstream functional element, one of the one or more downstream functional elements based at least in part on the one or more routing control variables and the corresponding value selected by the one or more downstream functional elements; and
   routing, at the upstream functional element, the incoming emergency call to the selected one of the one or more downstream functional elements.

2. The method of claim 1, wherein selecting comprises:
   comparing the corresponding value selected by the one or more downstream functional elements for each of the one or more routing control variables with the policy routing rule that is defined relative to each of the one or more routing variables; and
   selecting the one of the one or more downstream functional elements when the corresponding value selected by the one of the one or more downstream functional elements for each of the one or more routing control variables meets the policy routing rule relative to the one or more routing control variables.

3. The method of claim 1, further comprising:
   receiving a subsequent call queue state notification from the one or more downstream functional elements, the subsequent call queue state notification indicating a state of the call queue respectively maintained by the one or more downstream functional elements and further including one or more updated routing control variables and a corresponding value selected by the one or more downstream functional elements for each of the one or more updated routing control variables, wherein the one or more updated routing control variables included in the subsequent call queue state notification is different from the one or more routing control variables included in the call queue state notification; and
   generating, in response to receiving the subsequent call queue state notification, an updated policy routing function condition using the one or more updated routing control variables, wherein the updated policy routing function condition defines an updated policy routing rule relative to each one of the one or more updated routing control variables.

4. The method of claim 1, wherein the one or more routing control variables are selected from the group consisting of:
   a number of calls of a given media type that are currently being handled by the downstream functional element;
   a maximum number of calls of a given media type to be handled by the downstream functional element; and
   a number of agents with a given skill, knowledge, or a spoken language associated with the downstream functional element.

5. The method of claim 4, wherein the given media type is selected from the group consisting of voice, data, video, audio, text, image, and application.

6. The method of claim 1, wherein the state of the call queue includes information related to:
   state enumeration identifying a state of one or more entities that are responsible for handling the calls being enqueued in the call queue;
   current queue length identifying a current number of calls that are enqueued in the call queue; and
   allowed maximum length identifying a maximum number of the calls to be enqueued in the call queue.

7. The method of claim 1, wherein the upstream functional element comprises an emergency service routing proxy.

8. The method of claim 1, wherein the at least one other upstream functional element comprises at least one of a call originating device or another emergency service routing proxy.

9. The method of claim 1, wherein the downstream functional element includes at least one of another emergency service routing proxy or a public safety answering point.

10. The method of claim 1, wherein the one or more routing control variables include:
    a first variable identifying a number of voice calls currently being handled by the one or more downstream functional elements;
    a second variable identifying a maximum number of voice calls to be handled by the one or more downstream functional elements;
    a third variable identifying a number of text calls currently being handled by the one or more downstream functional elements;
    a fourth variable identifying a maximum number of text calls to be handled by the one or more downstream functional elements;
    a fifth variable identifying a number of video calls currently being handled by the one or more downstream functional elements; and
    a sixth variable identifying a maximum number of video calls to be handled by the one or more downstream functional elements.

11. The method of claim 10, wherein selecting comprises one or more of:
    selecting the one of the one or more downstream functional elements when a call type associated with the incoming emergency call is a voice call and further when the call queue state notification received from the one of the one or more downstream functional elements includes a value for the first variable identifying the number of voice calls that is lower than a value for the second variable identifying the maximum number of voice calls;

selecting the one of the one or more downstream functional elements when a call type associated with the incoming emergency call is a text call and further when the call queue state notification from the one of the one or more downstream functional elements includes a value for the third variable identifying the number of text calls that is lower than the fourth variable identifying the maximum number of text calls; and selecting the one of the one or more downstream functional elements when a call type associated with the incoming emergency call is a video call and further when the call queue state notification from the one of the one or more downstream functional elements includes a value for the fifth variable identifying the number of voice calls that is lower than the sixth variable identifying the maximum number of text calls.

12. A device operating as an upstream functional element in an emergency service network, the device comprising:
a network interface;
an electronic processor communicatively coupled to the network interface; and
a memory coupled to the electronic processor, wherein the electronic processor is configured to:
receive, via the network interface, a call queue state notification from one or more downstream functional elements of the emergency service network, the call queue state notification indicating a state of a call queue respectively associated with the one or more downstream functional elements and further including one or more routing control variables and a corresponding value selected by the one or more downstream functional elements for each of the one or more routing control variables;
store, at the memory, the call queue state notification received from the one or more downstream functional elements;
generate, in response to receiving the call queue state notification, a new policy routing function condition using the one or more routing control variables, wherein the new policy routing function condition defines a policy routing rule relative to the one or more routing control variables, and store the new policy routing function condition at the memory;
receive, via the network interface, an incoming emergency call from at least one other upstream functional element of the emergency service network;
select one of the one or more downstream functional elements based at least in part on the one or more routing control variables and the corresponding value selected by the one or more downstream functional elements; and
route, via the network interface, the incoming emergency call to the selected one of the one or more downstream functional elements.

13. The device of claim 12, wherein the electronic processor is configured to:
compare the corresponding value selected by the one or more downstream functional elements for each of the one or more routing control variables with the policy routing rule that is defined relative to each of the one or more routing variables; and
select the one of the one or more downstream functional elements when the corresponding value selected by the one of the one or more downstream functional elements for each of the one or more routing control variables meets the policy routing rule that is defined relative to the one or more routing control variables.

14. The device of claim 12, wherein the one or more routing control variables are selected from the group consisting of:
a number of calls of a given media type that are currently being handled by the downstream functional element;
a maximum number of calls of a given media type to be handled by the downstream functional element; and
a number of agents with a given skill, knowledge, or a spoken language associated with the downstream functional element.

15. The device of claim 14, wherein the state of the call queue includes information related to:
state enumeration identifying a state of one or more entities that are responsible for handling the calls being enqueued in the call queue;
current queue length identifying a current number of calls that are enqueued in the call queue; and
allowed maximum length identifying a maximum number of the calls to be enqueued in the call queue.

16. An emergency response system, comprising:
a plurality of public safety answering points; and
an emergency service routing proxy configured to communicate with the public safety answering points via an emergency service internet protocol (IP) network, wherein the emergency service routing proxy is configured to:
receive a call queue state notification from one or more of the public safety answering points, the call queue state notification indicating a state of a call queue respectively associated with the one or more of the public safety answering points and further including one or more routing control variables and a corresponding value selected by the one or more of the public safety answering points for each of the one or more routing control variables;
generate, in response to receiving the call queue state notification, a new policy routing function condition using the one or more routing control variables, wherein the new policy routing function condition defines a policy routing rule relative to each of the one or more routing control variables;
receive an incoming emergency call from a call originating device;
select one of the one or more of the public safety answering points based at least in part on the one or more routing control variables and the corresponding value selected by the one or more of the public safety answering points; and
route the incoming emergency call to the selected one of the one or more of the public safety answering points.

17. The emergency response system of claim 16, wherein the emergency service routing proxy is configured to:
compare the corresponding value selected by the one or more of the public safety answering points for each of the one or more routing control variables with the policy routing rule that is defined relative to each of the one or more routing variables; and
select the one of the one or more of the public safety answering points when the corresponding value selected by the one of the one or more of the public safety answering points for each of the one or more routing control variables meets the policy routing rule that is defined relative to the each of the one or more routing control variables.

\* \* \* \* \*